United States Patent [19]
Fawcett et al.

[11] Patent Number: 5,678,002
[45] Date of Patent: Oct. 14, 1997

[54] SYSTEM AND METHOD FOR PROVIDING AUTOMATED CUSTOMER SUPPORT

[75] Inventors: Philip E. Fawcett, Duvall; Christopher Blomfield-Brown, Seattle, both of Wash.

[73] Assignee: Microsoft Corporation, Redmond, Wash.

[21] Appl. No.: 503,699

[22] Filed: Jul. 18, 1995

[51] Int. Cl.[6] .................................................. G06F 11/00
[52] U.S. Cl. .................. 395/183.01; 395/336; 395/200.2; 395/183.22
[58] Field of Search .................. 395/183.22, 183.01, 395/185.1, 326, 329, 336, 200.2, 610

[56] References Cited

U.S. PATENT DOCUMENTS

| | | | |
|---|---|---|---|
| 4,057,847 | 11/1977 | Lowell | 395/183.22 X |
| 4,356,545 | 10/1982 | West | 395/183.22 |
| 4,425,625 | 1/1984 | Seligman | 364/900 |
| 4,695,946 | 9/1987 | Andreasen | 364/200 |
| 4,823,343 | 4/1989 | Takahashi | 395/183.22 |
| 5,084,875 | 1/1992 | Weinberger | 395/183.22 |
| 5,164,982 | 11/1992 | Davis | 379/96 |
| 5,287,505 | 2/1994 | Calvert | 395/600 |
| 5,297,256 | 3/1994 | Wolstenholme | 395/162 |
| 5,325,156 | 6/1994 | Ulinsk | 395/183.22 X |
| 5,365,577 | 11/1994 | Davis et al. | 379/96 |
| 5,367,667 | 11/1994 | Wahlquist | 395/183.22 X |
| 5,388,252 | 2/1995 | Dreste | 395/183.22 |
| 5,392,095 | 2/1995 | Siegel | 355/200 |
| 5,455,933 | 10/1995 | Schieve | 395/183.03 |

FOREIGN PATENT DOCUMENTS

WO 94/26056  11/1994  WIPO.

OTHER PUBLICATIONS

"Voice View TalkShop," 2 page brochure by RADISH VoiceView, Boulder, Colorado, undated.

"Radish VoiceView Interactive VRU Server Developer's Bundle," 2 page brochure by RADISH VoiceView, Boulder, Colorado, undated.

"Radish VoiceView revolutionizes the way people use their standard telephones," 7 pages by RADISH VoiceView, Boulder, Colorado, undated.

Bernard, "Radish's VoiceView takes root," *PC Week*, Apr. 17, 1995, pp. 47, 51.

*Primary Examiner*—Robert W. Beausoliel, Jr.
*Assistant Examiner*—Dieu-Minh Le
*Attorney, Agent, or Firm*—Klarquist, Sparkman, Campbell Leigh & Whinston

[57] ABSTRACT

An automated system and method for diagnosing and resolving computer-related problems from a product support center. The traditional roles of the product engineer and customer are largely supplanted by execution of specialized client/server software programs on the respective computers. These programs exchange diagnostic and—in some cases—remedial data over the same telephone circuit used by the engineer and customer. The resulting system accelerates diagnosis and resolution of the customers' problems, reduces product support costs, and improves customer satisfaction.

33 Claims, 11 Drawing Sheets

SYSTEM AND METHOD FOR PROVIDING AUTOMATED CUSTOMER SUPPORT

FIELD OF INVENTION

The present invention relates to automated support for computer products, and more particularly relates to provision of such support using a voice/data modem.

BACKGROUND AND SUMMARY OF THE INVENTION

Support of software products is a very expensive and time consuming process. When a customer experiences problems with a software product, the customer typically calls a product support help line and receives assistance from a product support engineer. The support engineer typically asks the customer questions to help diagnose the customer's problem and often asks the customer to execute a series of commands on the computer to aid in the diagnosis. After this diagnostic data is reported back to the product support engineer, the engineer offers a proposed diagnosis and instructs the customer with further steps that must be undertaken to remedy the problem.

If a software fix or patch is required, the customer must obtain the fix or patch, (e.g. on a floppy disk from the product support center, downloaded by modem, etc.) and then install it. Help with the fix/patch installation may require an additional call back to the product support center, thus, increasing the cost to fix to the manufacturer.

The foregoing procedure is typically slow and frustrating. Errors and delays arise at every step, from imperfect communications (e.g. limitations of the phone as the primary communication mechanism) in the diagnosis phase, to typing and syntax errors in the solution and solution delivery phases. This process is unsatisfactory both to customers and software vendors, and yet has been the industry's standard operating procedure for decades.

In accordance with the present invention, these and other failings of the prior art are overcome. In a preferred embodiment, the roles of the product engineer and customer are largely supplanted by execution of specialized client/server software programs on the respective computers. These programs exchange diagnostic and—in some cases—solution data over the same telephone circuit used by the engineer and customer. The resulting system accelerates diagnosis and resolution of the customers' problems, reduces product support costs, and improves customer satisfaction.

In more detail, a customer calling a product support center in accordance with one embodiment of the present invention is first asked a series of questions by an interactive voice response (IVR) system. The customer uses Touch-Tone keys on the telephone to respond to these queries. Based on the customer's responses, the product support center's computer automatically asks the customer's computer, over the same telephone line, to transmit certain background/diagnostic information that may be relevant to the customer's problem. In another embodiment, the operating system components on the customer's computer may be examined to determine whether they are up to date. If they are not, outdated components can be automatically updated.

All of the foregoing steps occur before the customer speaks with a product support engineer. When a product support engineer becomes available, the previously gathered information (both from the IVR query responses and the diagnostic information solicited from the customer's computer and posted from the server) is available to the product support engineer.

After reviewing the situation with the customer, the product support engineer can query the customer's computer via support agents for additional information, if necessary. If the customer's computer does not contain certain diagnostic software necessary for the engineer to continue the diagnosis, the diagnostic software can be downloaded to the customer's computer using only one phone line (e.g. one analog phone line).

If the product support engineer (or the product support center computer) determines that the customer requires a fix or patch, the fix or patch can be downloaded to the customer's computer. The product support engineer can then give further instructions to the customer on how to install the fix or patch. Alternatively, the installation can be handled automatically by software in the customer's computer.

In systems according to the preferred embodiment, the customer spends less time interacting with a product support engineer, and is relieved of many of the responsibilities in diagnosing and resolving problems. Automated diagnoses and shorter customer interactions save the product support center time, resources, and money. At the same time, the customer receives a better diagnosis and resolution of the problem than could usually be achieved with prior art product support techniques.

The foregoing and other features and advantages of the present invention will be more readily apparent from the following detailed description, which proceeds with reference to the accompanying drawings.

DETAILED DESCRIPTION OF A PREFERRED EMBODIMENT

Figure 1:
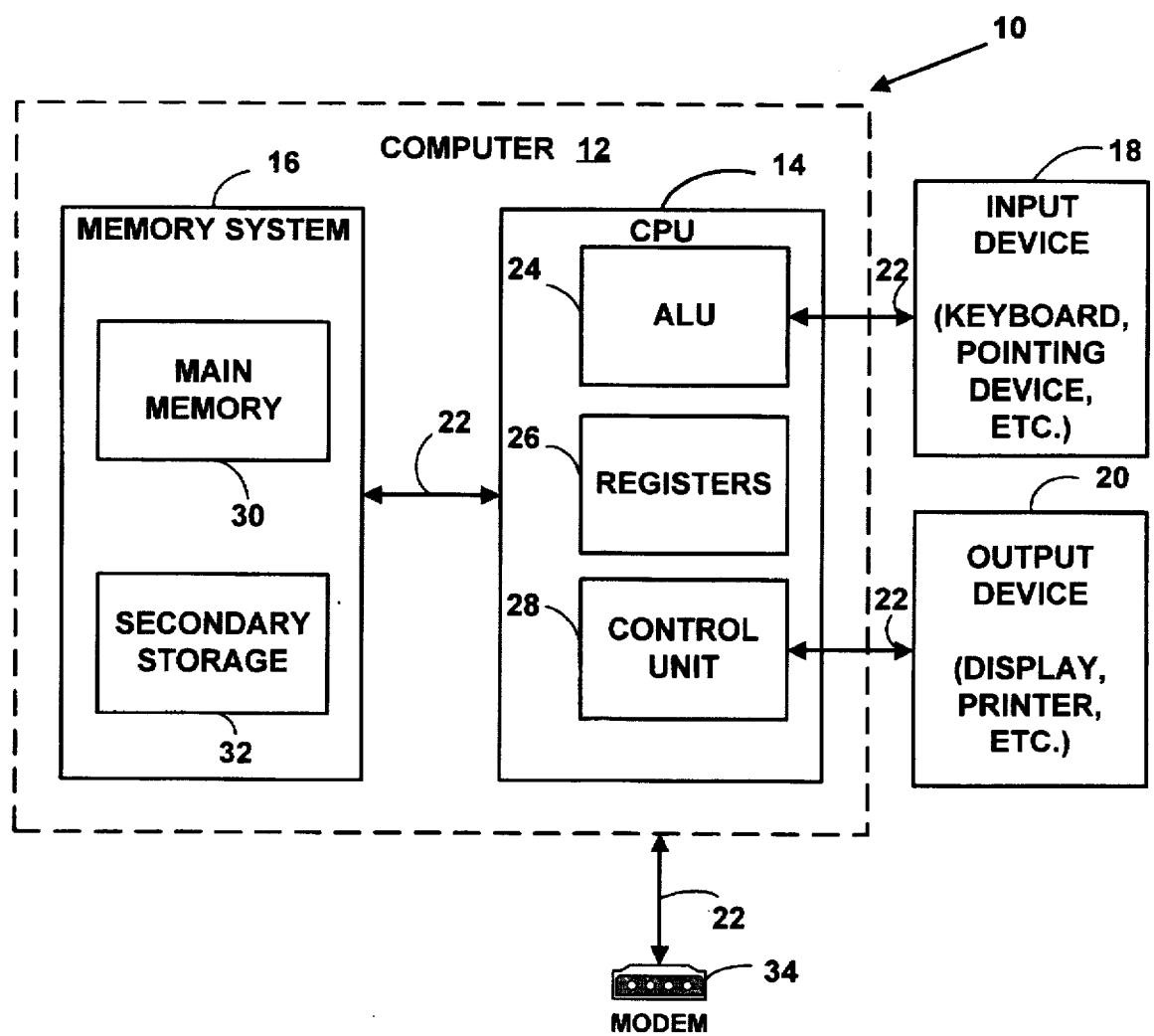
FIG. 1 is a block diagram of a computer system used to implement a preferred embodiment of the present invention.

Referring to FIG. 1, an operating environment for the preferred embodiment of the present invention is a computer system 10 with a computer 12 that comprises at least one high speed processing unit (CPU) 14, in conjunction with a memory system 16, an input device 18, and an output device 20. These elements are interconnected by a bus structure 22.

The illustrated CPU 14 is of familiar design and includes an ALU 24 for performing computations, a collection of registers 26 for temporary storage of data and instructions, and a control unit 28 for controlling operation of the system 10.

Any of a variety of processors, including those from Digital Equipment, Sun, MIPS, IBM, Motorola, NEC, Intel, Cyrix, AMD, Nexgen and others can be used for CPU 14. Although shown with one CPU 14, computer system 10 may alternatively include multiple processing units.

The memory system 16 includes main memory 30 and secondary storage 32. Illustrated main memory 30 is high speed random access memory (RAM) and read only memory (ROM). Main memory 30 can include any additional or alternative high speed memory device or memory circuitry. Secondary storage 32 takes the form of long term storage, such as ROM, optical or magnetic disks, organic memory or any other volatile or non-volatile mass storage system. Those skilled in the art will recognize that memory 16 can comprise a variety and/or combination of alternative components.

The input and output devices 18, 20 are also familiar. The input device 18 can comprise a keyboard, mouse, pointing device, sound device (e.g. a microphone, etc.), or any other device providing input to the computer system 10. The output device 20 can comprise a display, a printer, a sound device (e.g. a speaker, etc.), or other device providing output to the computer system 10. The input/output devices 18, 20 include a modem 34 used for communications with other computer systems or devices.

As is familiar to those skilled in the art, the computer system 10 further includes an operating system and at least one application program. The operating system is the set of software which controls the computer system's operation and the allocation of resources. The application program is the set of software that performs a task desired by the user, making use of computer resources made available through the operating system. Both are resident in the illustrated memory system 16.

In accordance with the practices of persons skilled in the art of computer programming, the present invention is described below with reference to symbolic representations of operations that are performed by computer system 10, unless indicated otherwise. Such operations are sometimes referred to as being computer-executed. It will be appreciated that the operations which are symbolically represented include the manipulation by CPU 14 of electrical signals representing data bits and the maintenance of data bits at memory locations in memory system 16, as well as other processing of signals. The memory locations where data bits are maintained are physical locations that have particular electrical, magnetic, optical, or organic properties corresponding to the data bits.

The preferred embodiment of the invention is implemented in the Microsoft Windows 95 operating system using VoiceView data protocol technology by Radish Communications Systems of Boulder, Colo. The VoiceView data protocol technology has been enhanced to provide functionality not available in the standard VoiceView data protocol. VoiceView data transfer allows both voice and data to be transmitted during the same telephone call and is described, for example, in patent publications U.S. Pat. No. 5,365,577, U.S. Pat. No. 5,164,982, and WO 94/26056, the disclosures of which are incorporated by reference. (Under VoiceView, only voice OR data is transmitted at any one particular instance in time. The invention can likewise be practiced with technologies that allow simultaneous voice/data transfer, such as ISDN.)

Figure 2:
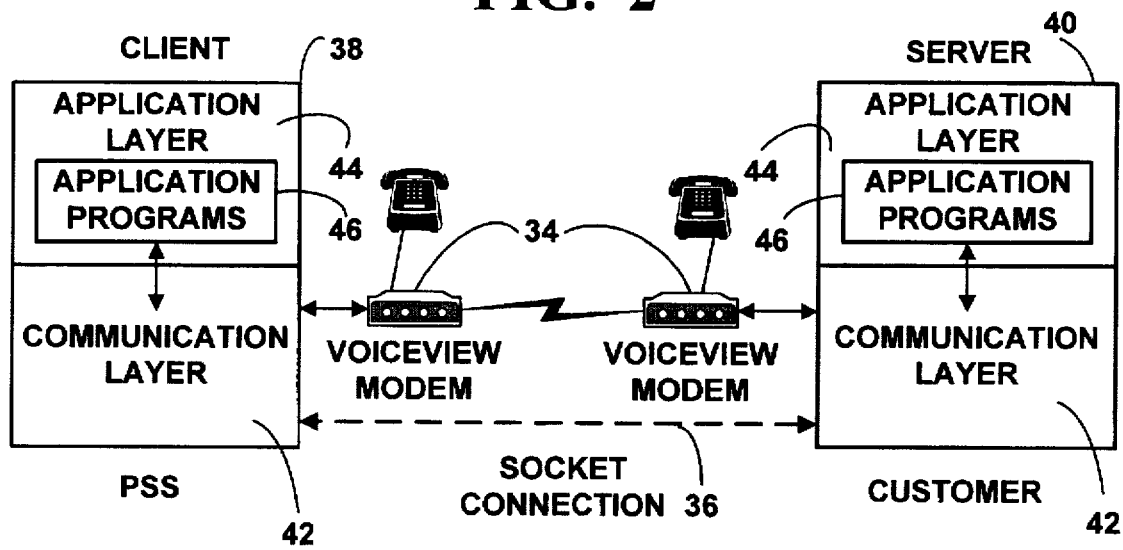
FIG. 2 is a block diagram showing the layered PSS client/server messaging architecture.

The product support services (PSS) client/server messaging system is implemented using VoiceView modems 34 as is shown in FIG. 2. The VoiceView modems establish a socket connection 36 that is used for communications between a client 38 and a server 40. The PSS messaging system implements a two-layer protocol stack: the communication layer 42 and the application layer 44. The communication layer's 42 primary responsibility is to transfer data between the client 38 and the server 40. The client 38 represents a PSS computer center and the server 40 represents the customer's personal computer. The two layer protocol stack provides a common network protocol for passing data and issuing commands between the client 38 and server 40.

The application layer's 44 purpose is to utilize the communication layer's network services while maintaining ignorance of the networks underlying protocol and hardware The PSS's diagnostic and trouble-shooting programs 46 reside in the application layer 44.

The two-layered protocol approach frees the application program 46 from the communication protocol complexity and implementation. The two-layer protocol stack operates over a socket connection. A socket is a communication object from which messages are sent and received. Sockets are common inter-process communication objects in many operating systems (e.g. 4.x BSD UNIX, Windows 95, etc.).

Whether the messaging system is based on VoiceView sockets, UNIX sockets, or datagrams, the protocol details are entirely hidden from the application layer 44. Therefore, the PSS diagnostic applications 46 will not have to be rewritten if the underlying communication protocol is changed. Also, socket management code need not be replicated in each of the application programs 46. Another benefit of this architecture is that any number of client diagnostic programs can communicate with their corresponding server diagnostic programs through this common protocol. Client and server applications do not communicate directly with each other because replacement of the network platform and/or network protocol would make the diagnostic applications obsolete.

Figure 3:
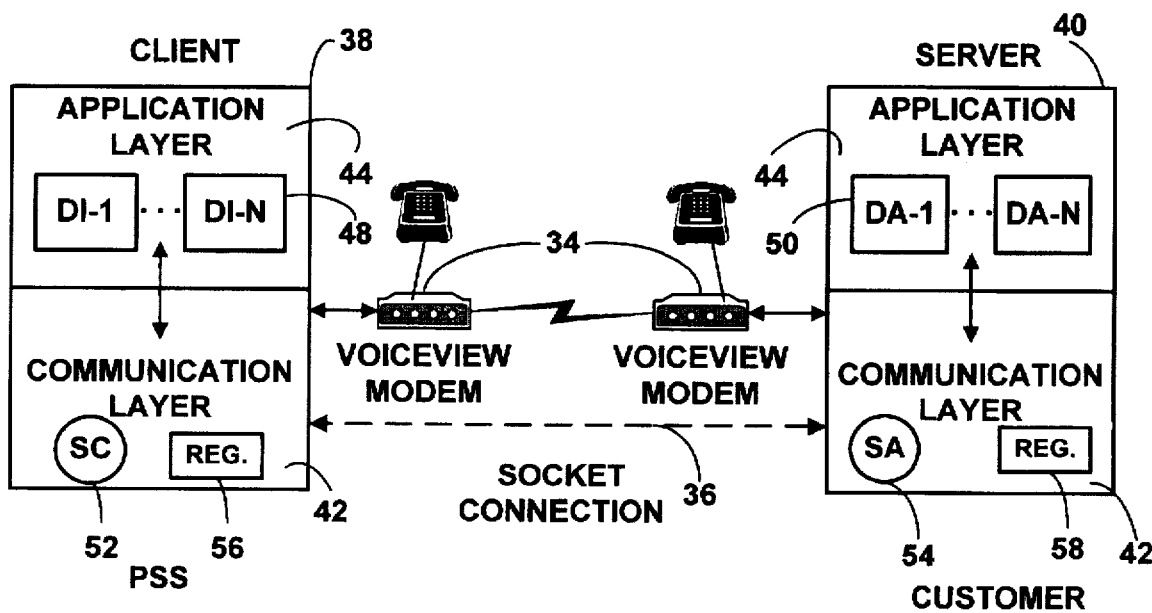
FIG. 3 is a block diagram showing greater detail within the of the PSS messaging architecture.

The PSS messaging system diagnostic applications have two components: diagnostic interpreters (DIs) 48 and diagnostic agents (DAs) 50 as is shown in FIG. 3. The diagnostic interpreter 48 is client software which initiates diagnostic commands and interprets their results for the PSS. The diagnostic agent 50 is server software which executes commands issued by the diagnostic interpreter and then returns results to the PSS.

Since the communications layer 42 is implemented over sockets, a server process on the customer's computer must execute a socket related accept( ) function call before the client can successfully complete a socket related connect( ). Otherwise, no connection can be made. As is well known in the art, a socket connection is asymmetric under the client/server model. A client process actively initiates a connection (via connect( )) to obtain service, whereas a server process passively accepts (via accept( )) connections to provide service.

The PSS client/server messaging system has both client and server components in the communications layer 42 that are used for message transfer. The support client (SC) 52 is a client messaging process which sends and receives messages on behalf of diagnostic interpreters 48. The support agent (SA) 54 is a server messaging process that resides on the customer's computer which sends and receives messages on behalf of diagnostic agents 50. Also included in the communications layer 42 of both the client and the server are registries, 56 and 58 respectively, used to keep track of which client/server processes are sending/receiving messages. Use of registries is explained below.

Figure 4:
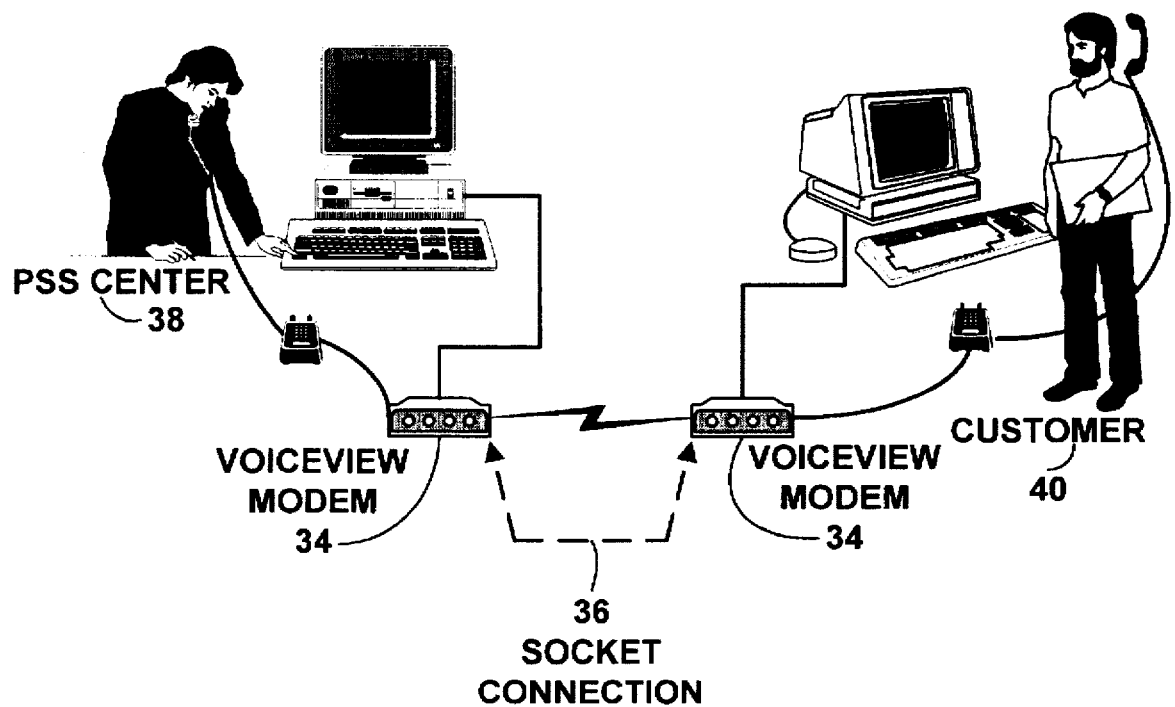
FIG. 4 is a picture diagram showing how a customer and a product support center engineer would interact.

As is shown in FIG. 4, when a customer 40 calls a product services support 38 center with a VoiceView modem 34 and wants help with a particular problem, a communications path (via a socket connection) 36 for data transfer must be set up over the voice line the customer is talking on. The flowchart in FIGS. 5A–E shows the steps required to set a up a PSS communications path from the PSS computer center to a user and diagnose their computer problems. In the paragraphs that follow, the numbers in parenthesis represent steps in the flow chart shown in FIGS. 5A–E. Numbers without parenthesis refer to the components of FIG. 3.

Figure 5A:
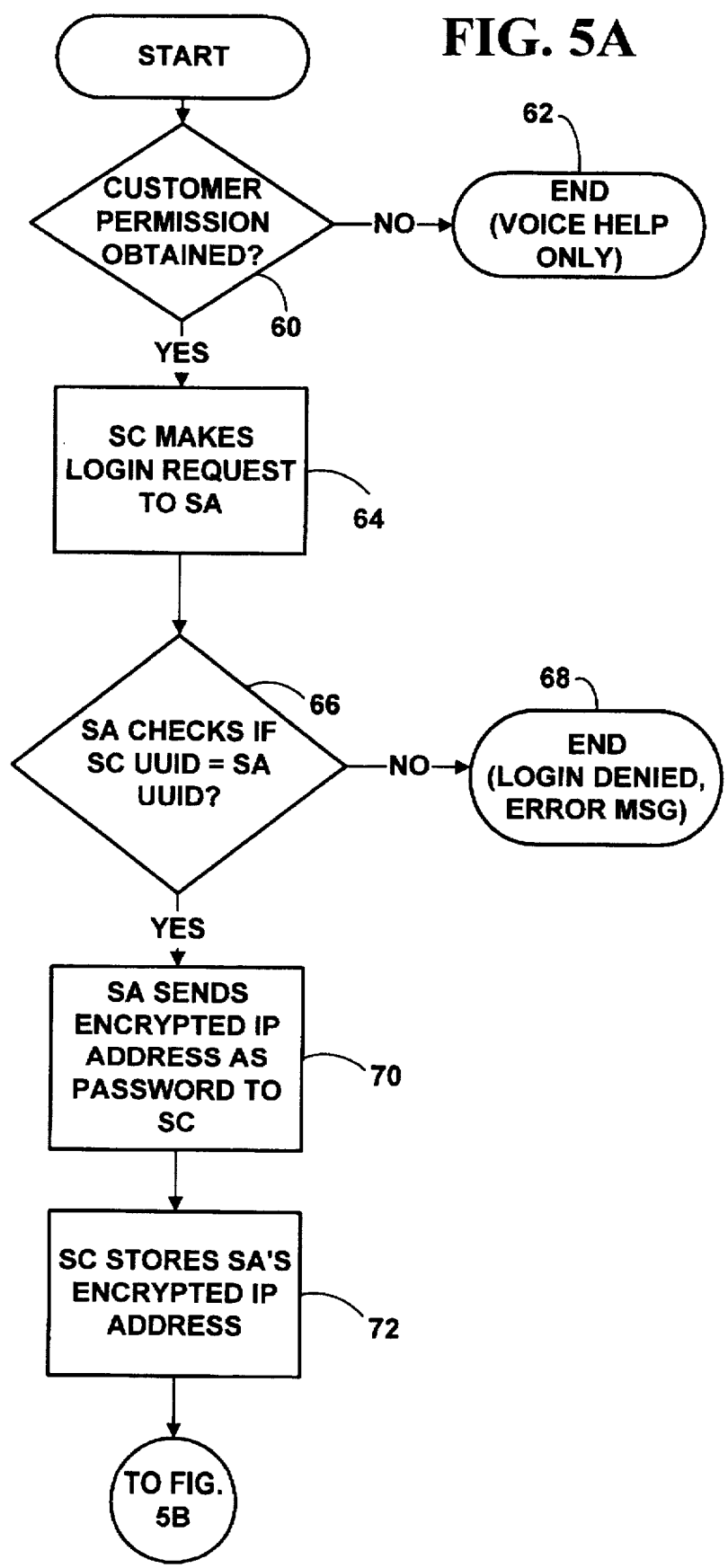
FIGS. 5A–5E is a flowchart showing the steps required to set up a communications path between the client and server shown in FIG. 3.
Figure 5B:
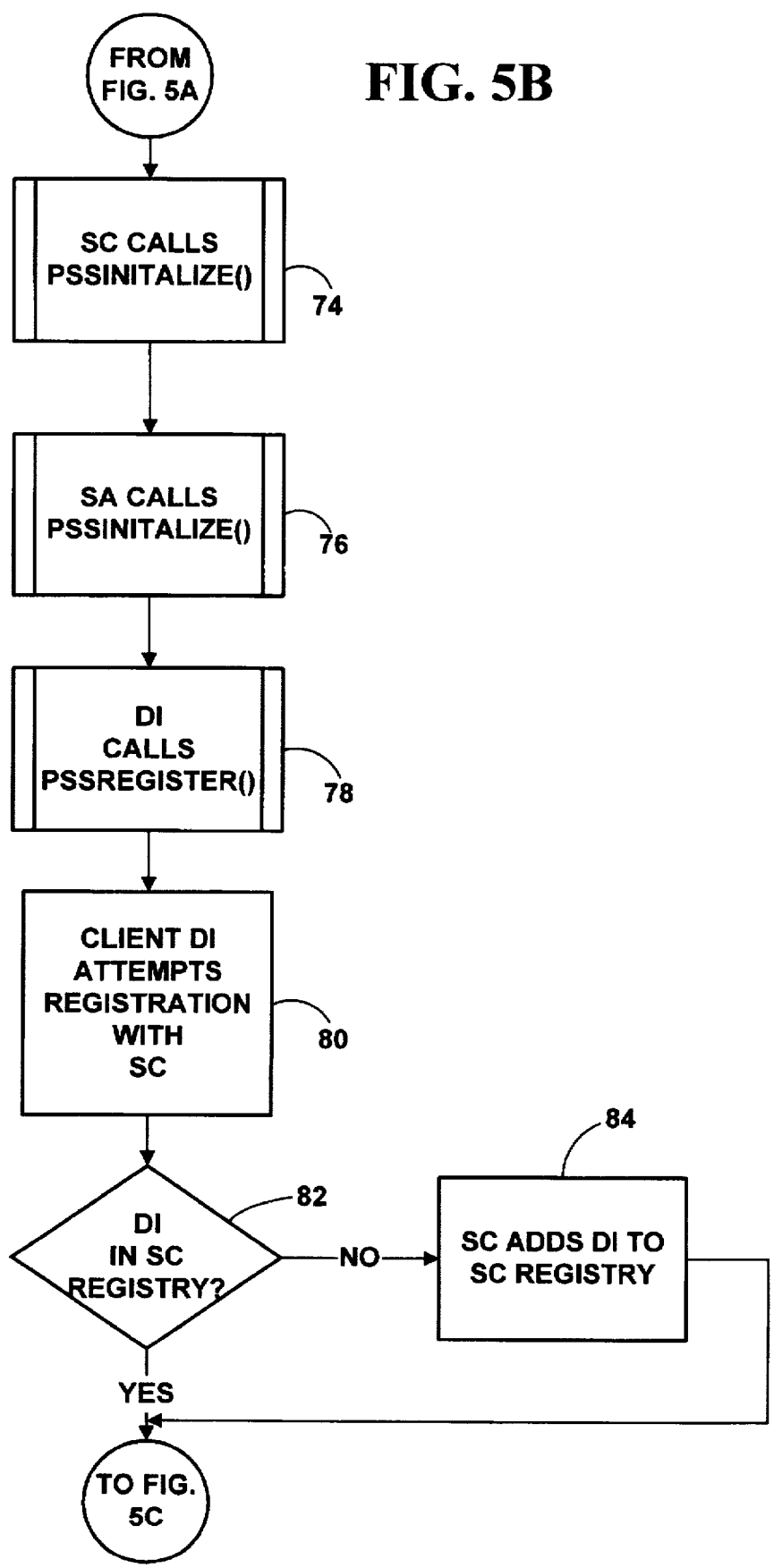
Figure 5C:
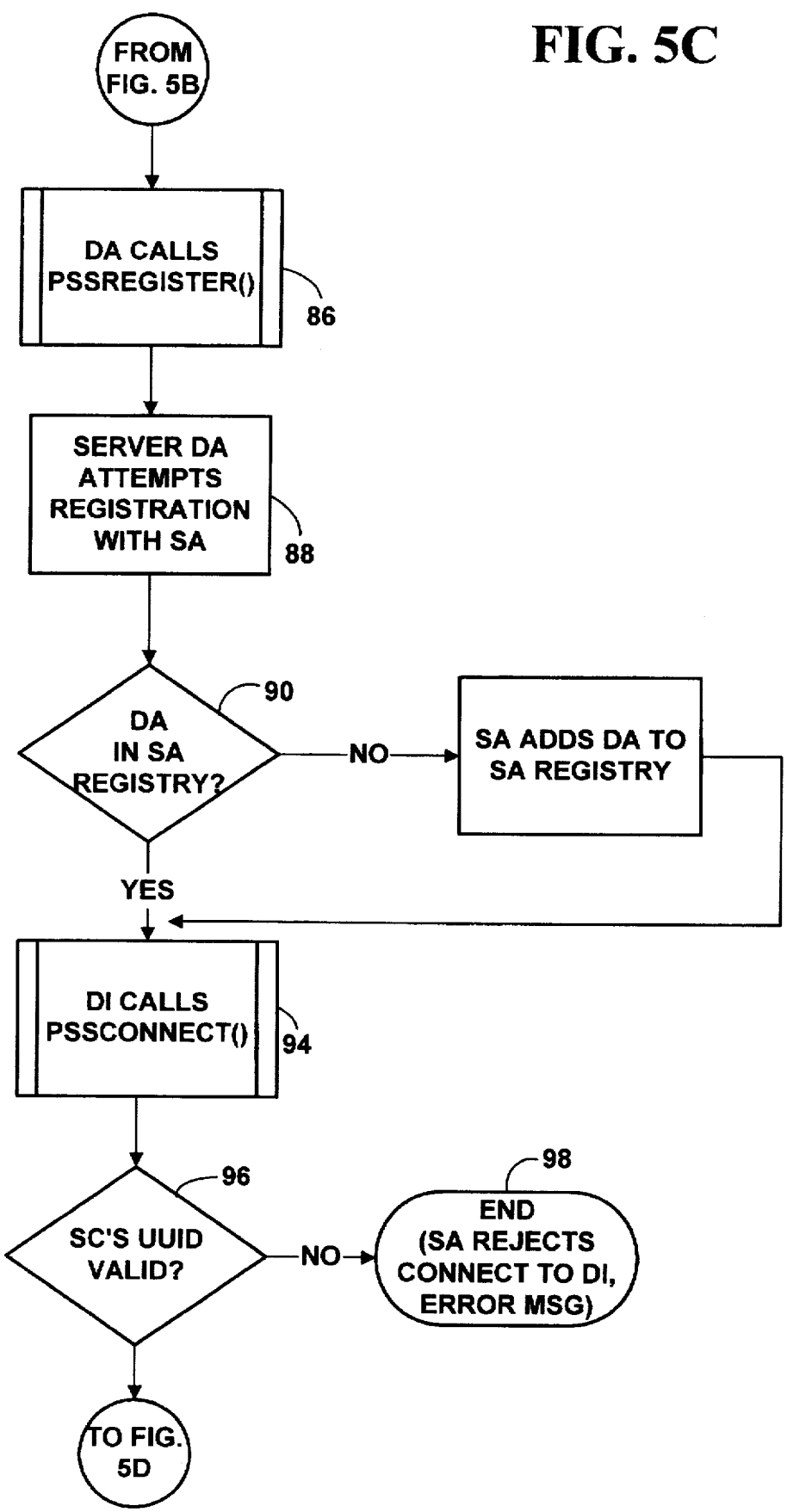

Referring now to FIG. 5A, the first step to help a customer is to ask for permission (60) for remote a login on the customer's computer. If permission is not obtained (62) then the customer will receive help with voice instructions only via the telephone (i.e. a "normal" support transaction). Utilizing a socket protocol which allows a PSS 38 to download files and/or make changes to a customer's personal computer system 40 can potentially be very dangerous to both parties of the transaction if not managed properly.

To initiate a customer support session, security measures are taken to ensure confidence and responsibility for both the customer and the PSS. A security mechanism which protects the customer 40, the PSS 38, and the communication path 36 from unauthorized inspection and intrusion is used.

The PSS security mechanism has two security components: a login and password. The login identifies the client as the PSS and the password authenticates the login. The login consists of a matching a Unique Universal IDentifier (UUID) (i.e. an identifier used to identify a particular process on a particular computer). The support client and support agent share one UUID as defined by Windows 95's socket protocol. Neither the support client nor the support agent will entertain foreign host messages if the UUID is not identical. The UUID is what differentiates the requesting client from any other client and therefore uniquely identifies the PSS. This gives confidence to both the PSS and the customer that only the customer support protocol is being executed.

The password consists of the server's encrypted Internet Protocol (IP) address. Sockets commonly use the Internet Protocol as a network interface. The Internet Protocol is responsible for host-to-host addressing, routing, packet forwarding, packet fragmentation and reassembly of information passed through the socket.

On a request for login (64), if the support client's (SC) UUID does not match the support agent's (SA) (66), login on the customer's computer will be denied (68) and an error message sent to the support client. If the support client's UUID matches the support agent's, then support agent sends its encrypted IP address to the PSS as the session password (70). Therefore, to gain access to a customer's system the PSS must store (72) and have access to the following information: Server Access=(matching UUID, encrypted server IP).

The IP address is guaranteed to be unique and therefore uniquely identifies the server. All messages that transpire between the client and server must contain the server's IP address for authentication. To prevent unauthorized access, both the PSS and customer's IP addresses must be securely stored.

The login and password, in effect, give the diagnostic interpreter 48 an account on the customer's computer which is valid only during the support session. During any given session, the customer will be aware of any file downloads, changes to the system, its configuration files, or queries. A server log, and a corresponding support engineer log, notifies the customer (and support engineer) of every transaction that the client requests as well as every request for application download. By design, customers are not given access to the PSS computers. The PSS requests commands, the customer's computer responds to them. This protection is also followed by programs in the PSS's application layer.

Once the permission is received and a successful login completed, a communications path must be established between the customer and the PSS. The first step in establishing a communications path is a call to PSSInitialize( ) by both the support client (74) (FIG. 5B) and support agent (76). The PSSinitialize( ) function informs the communications layer 42 to terminate and purge all remote diagnostic agents, sever all socket connections, and clear internal tables (e.g. registry tables, etc.). The PSSinitialize( ) call is made from both the PSS, and the customer sides.

In the communications layer 42 on both the client and server side is a registry 56, 58 used to keep track of which client/server processes are sending/receiving messages. The registry is used by the messaging infrastructure in the communications layer 42 on both sides to keep track of which client/server processes are available and active.

To establish a connection between the PSS and a customer, a diagnostic interpreter 48 in the application layer 44 on the client (PSS) 38 side must first register (78) with the support client 52 (80) in the communications layer 42 on the client side 38 before using any network services on the client side. If the diagnostic interpreter is not already in the client registry 56 (82), the support client 52 will add the diagnostic interpreter to the registry 56 (84). In order to ensure proper message handling, the diagnostic interpreter 48 must supply a receive callback function address which will be called upon the arrival of messages destined for that specific interpreter. At this point, no attempt has been made to connect to the server (customer) because the diagnostic interpreter is only registering to receive messages.

On the server (customer) side 40, a diagnostic agent 50 in the application layer 44 must also register (86) (FIG. 5C) with the support agent 54 (88) on the server side in the communications layer 42 before using network services on the server side. If the diagnostic agent is not already in the server registry 58 (90), the support agent adds the diagnostic agent 50 to the registry (92). There is a set of resident diagnostic agents which are included in the Windows 95 operating system which can be used by the PSS. If a required diagnostic does not exist, then the diagnostic is downloaded to the customer's machine. This is explained in detail below. In order to ensure proper message handling, each diagnostic agent 50 must also supply a receive callback function address which will be called upon the arrival any messages destined for that specific agent.

The diagnostic interpreters and the diagnostic agents use the PSSRegister(AppUUID, CallbackProc) function (78, 86) which informs the communication layer that a diagnostic component is ready to receive messages. The AppUUID argument is a pointer to the UUID of the registering diagnostic component, and CallbackProc argument is a pointer to the callback function which will handle incoming messages for the diagnostic.

The support client 52 and support agent 54 each creates their own registry keys for storing the UUID of each diagnostic interpreters/agents registered. In fact, the support client 52 and support agent 54 must both maintain a mapping between a socket id and a particular process's (identified by its UUID) receive callback function address so that messages can be routed to the correct process on the correct computer. Thus, each support client and support agent saves the following information in their own registry 56, 58 for every registration: Message Map=(socket id, UUID, UUID's receive callback function address). The diagnostic interpreters 48 and diagnostic agents 50 in the application layer are responsible for providing correct message parsing and processing for messages they receive via the sockets.

Referring again to FIG. 5C, once the diagnostic interpreter 48 has registered with the support client 52 on the PSS (client) side 38, and the corresponding diagnostic agent 50 has registered with the support agent 54 on the customer side (server) 40, a request to connect to the diagnostic agent is then issued by the diagnostic interpreter 48 to the support client 52 using the PSSConnect(UUID, DeviceID) function call (94). The UUID argument is the UUID of the diagnostic interpreter 48, and the DeviceID argument is the VoiceView modem device id to use for subsequent calls.

As a result of the PSSConnect( ) call, the support client 52 encapsulates the diagnostic interpreter's 48 request into its own protocol headers and trailers and then connects via a socket to the support agent 54 on the customer (server) side 40. After receiving the message via a socket, the support agent 54 strips the protocol headers and trailers to obtain the diagnostic interpreter's request.

Communication between a particular interpreter and agent occurs via a socket id allocated to the pair. Socket setup (create( ), bind( ), listen( )), connection (connect( ), accept( )), and communication (send( ) receive( )) are well known and will be understood by those skilled in the art.

Figure 5D:
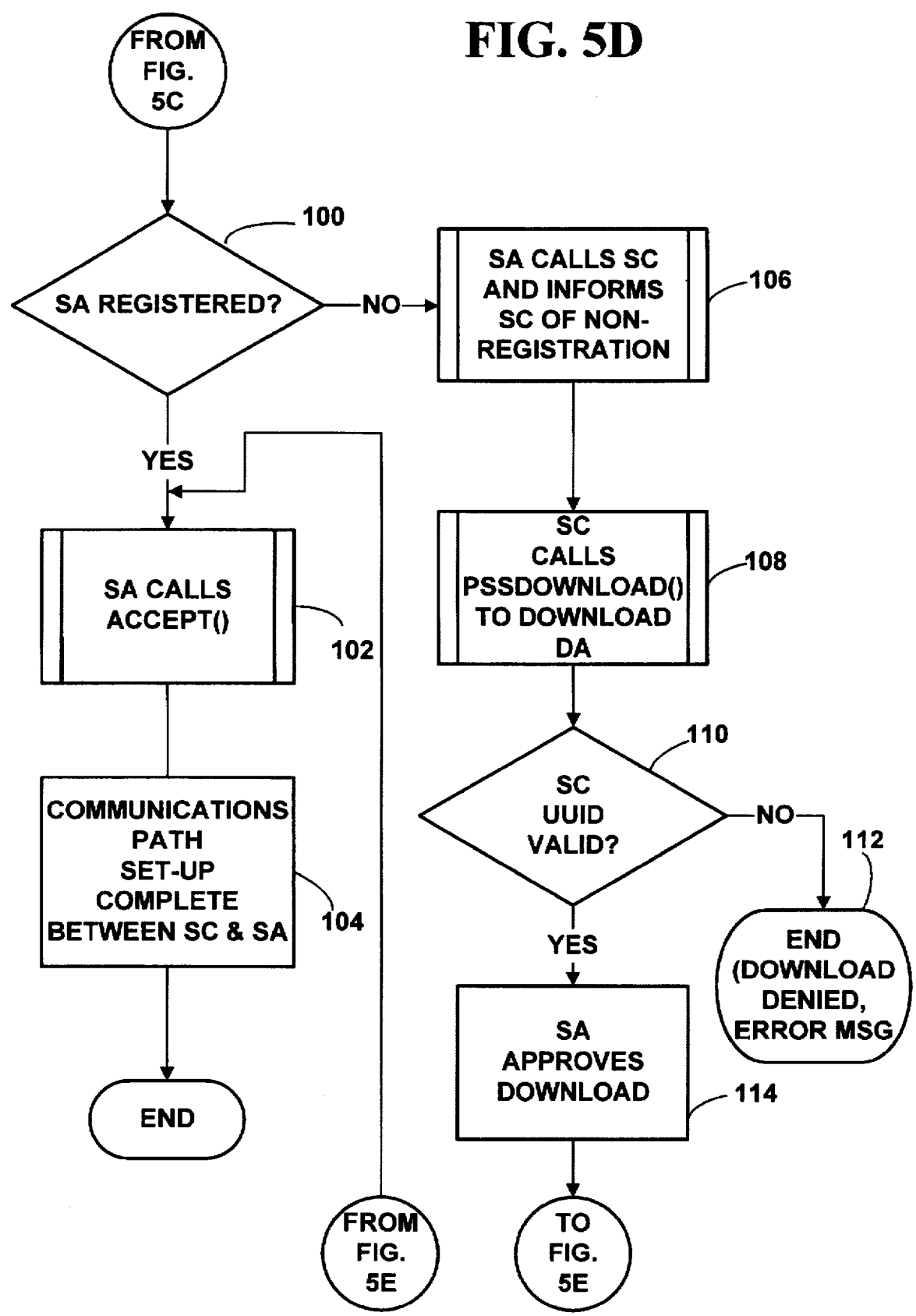
Figure 5E:
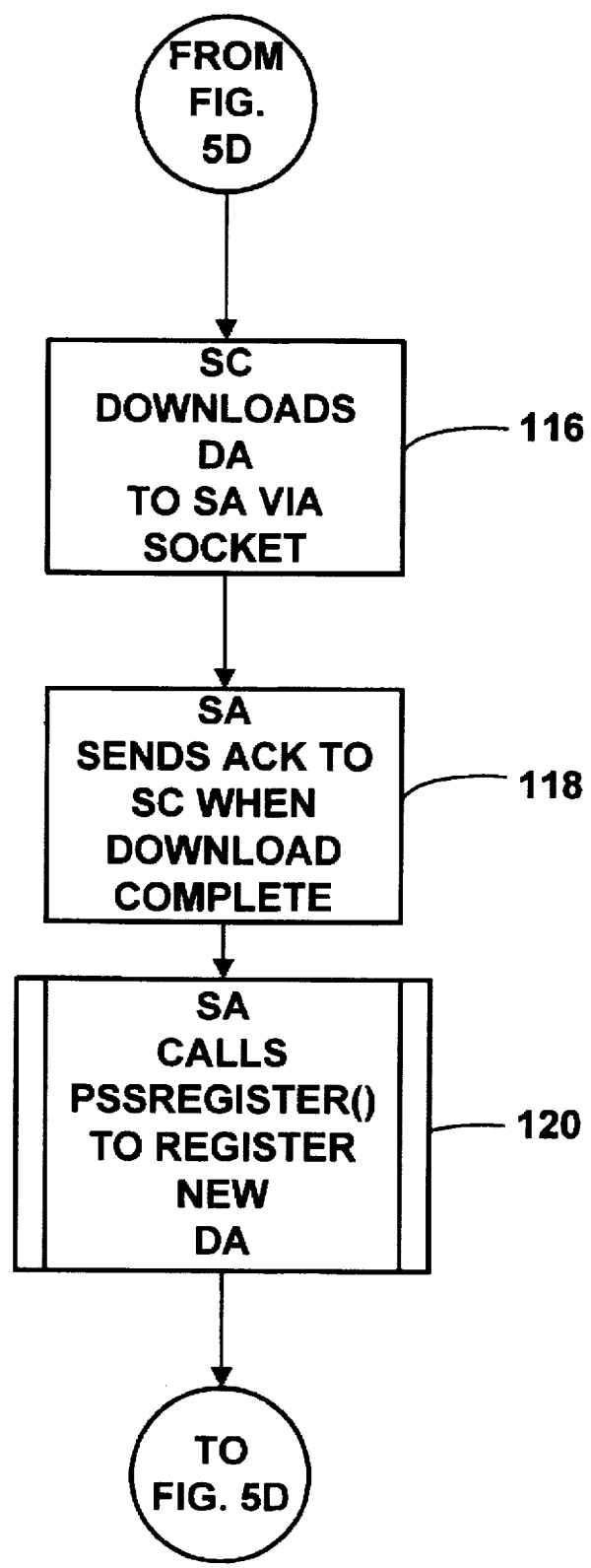

After the PSSConnect( ) call is made, the support agent 54 on the customer side 42 first verifies the support client's 52 UUID (96). If the UUID is invalid, the support agent 54 rejects the attempted connect and ends the communication (98) and sends an error message to the support client. If the support agent's UUID is valid, then the support client checks if the diagnostic agent 50 corresponding to the diagnostic interpreter 48 has been registered in the support agent's registry (100) (FIG. 5D).

If the relevant diagnostic agent has already been registered, then the support agent makes a call to accept( ) (102) to complete the socket communications connection between the diagnostic interpreter and the diagnostic agent. There is now a valid communications path (104) (via socket connection 36) between the PSS (client) 38 and the customer (server) 40. The diagnostic agent is now ready to receive messages from the remote diagnostic interpreter.

If a diagnostic agent is not registered, the support agent informs the support client of the registration problem (106). If a diagnostic agent is not registered, this usually means that the agent is not resident on the customer's computer. As a result, when the support client is contacted by the support agent with a registration problem, the support client tries to download a copy of the relevant diagnostic agent to the customer's computer. A PSSDownload(AppID, lpFiles, lpDescription) command is issued by the diagnostic interpreter to tell the support client to download the relevant diagnostic agent to the customer's computer (108). The AppID argument identifies the UUID of the requesting diagnostic interpreter. The lpFiles argument identifies the file or list of files to send and NULL terminated to end the file list. The lpDescription identifies a description of the file transfer. This description tells the remote server what files are being downloaded.

The support agent verifies the UUID of the PSSDownload( ) request (110). If the UUID is invalid, then the support agent terminates the communication (112) and sends an error message to the support client. If the UUID is valid, the support agent approves access for the download (114).

Once access has been approved by the support agent, the support client and support agent work together to transmit (116) (FIG. 5E) the requested number of bytes from a specified memory location, performing checksums to ensure the integrity of the message packets. After the download is complete, the support agent confirms the completion status of the download with an acknowledgement (118). The support agent then registers the diagnostic agent in its registry 58 (120). Once the diagnostic agent is registered the support agent makes an accept( ) call (102) (FIG. 5D) to complete the socket communications path (104) between the diagnostic interpreter and the diagnostic agent as was described above.

To execute a diagnostic agent 50 on the customer's computer 40, the diagnostic interpreter 48 issues a PSSExecute(AppId, lpExecuteFile) command. The AppId argument is the diagnostic interpreter UUID, and the lpExecuteFile is the name of the diagnostic agent to execute. The support client 52 forwards the execute command to the support agent 54. The support agent 54 then starts the requested diagnostic agent 50 on the customer's computer. The diagnostic interpreter 48 can issue a PSSexecute( ) command for a diagnostic agent that was just downloaded, or for a resident diagnostic agent that was previously loaded on the customer's computer when Windows 95 booted.

The diagnostic interpreter sends messages to the diagnostic agent (and visa versa) using the PSSsend(AddID, BufferToSend, BufferLength, MessageLength, lpfnNotifyProc) call. The AppID argument is the diagnostic interpreter's UUID, BufferToSend is the preformatted message buffer to send, MessageLength, is the length of the message to send, and lpfnNotfiyProc is a pointer to the diagnostic interpreter's callback routine.

As provided in the illustrated embodiment, there is no routine provided by the support client and the support agent that allows a diagnostic application to receive messages. The diagnostic interpreter and diagnostic agent provide a receive callback function when registering as was described above. The callback function is invoked every time that message arrives on the socket id associated with the UUID of the diagnostic interpreter/agent. The receive callback routine is in the following format: ReceiveCallbackFcn(AppID, ReceiveBuffer, BufferLength, MessageLength). The AppID argument, is the UUID of the diagnostic interpreter/agent, ReceiveBuffer identifies the data buffer containing the incoming message, BufferLength, identifies the length of the data in the buffer, MessageLength, identifies the length of the full message.

Figure 6A:
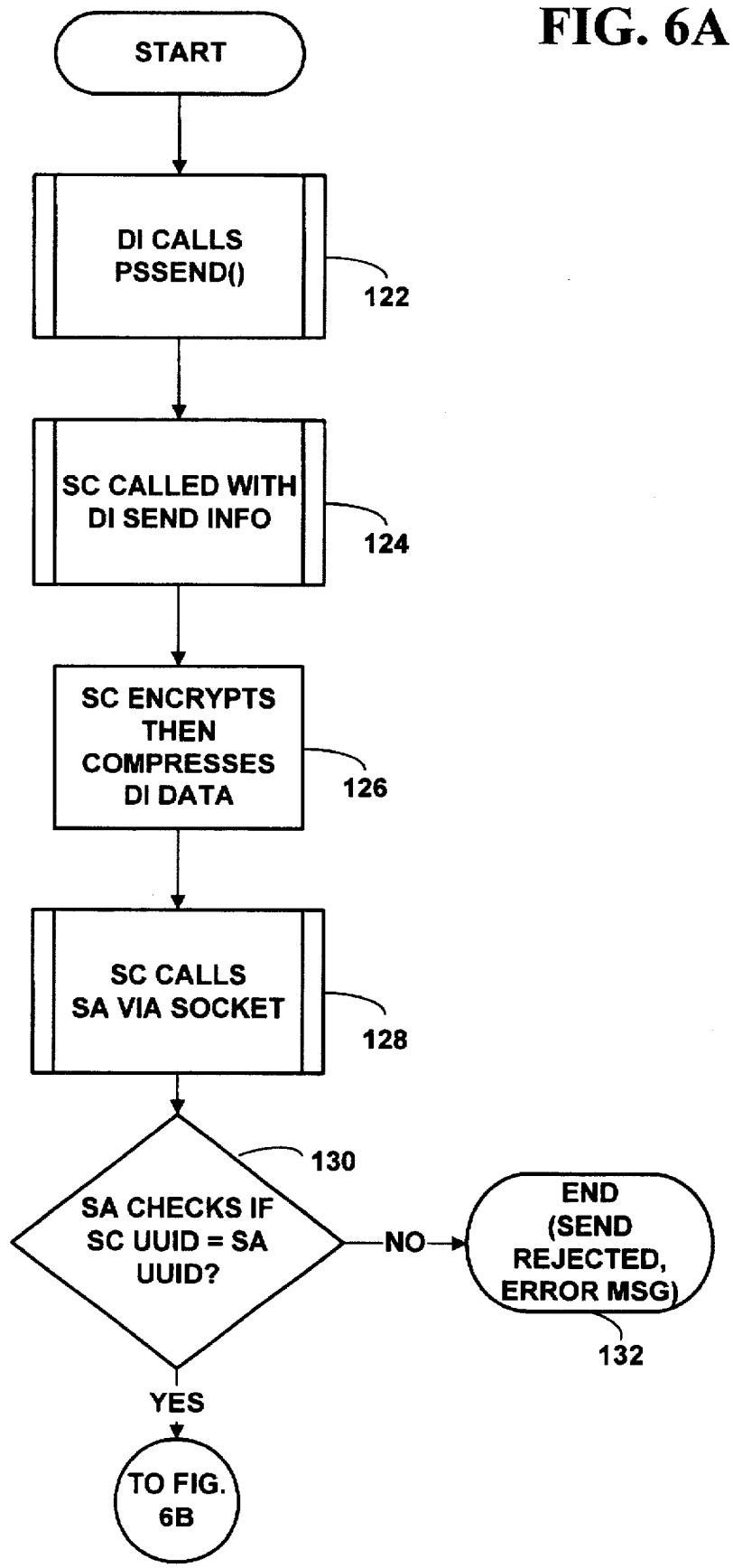
FIGS. 6A–6C is a flow chart showing the steps required to send and receive information between a client and server.

As is shown in FIG. 6A, when the diagnostic interpreter sends a message to the diagnostic agent with a PSSsend( ) call (122), the support client is called (124), and then the support client encrypts and then compresses the data obtained from the diagnostic interpreter (126) before adding protocol headers and trailers. The data is compressed to make size of the data smaller, and make the data transmission faster.

The support agent then receives a socket transmission from the support client (128). The support agent then performs a mapping between the socket id on which the message came in and the UUID in the message to see if it matches the Message Map (i.e. Message Map=(socket id, UUID, UUID's receive callback function address) as was described above) information for the diagnostic agent stored in the support agent's registry (130). If the UUID does not match, then the information is rejected (132) and an error message sent to the support client. If the socket id and UUID match, the support agent strips the protocol headers and trailers from the message, decompresses, then decrypts the data sent by the diagnostic interpreter (134) (FIG. 6B) and then calls the diagnostic agent's receive callback function with the decrypted data as an argument (136). The diagnostic agent's callback function then parses the message (138), interprets the data, and takes the proper action (140).

When results are obtained, the diagnostic agent returns the results with a call to PSSsend( )(144). The support agent is called (146), and then the support agent encrypts and compresses the data obtained from the diagnostic agent (148) before adding protocol headers and trailers.

Figure 6B:
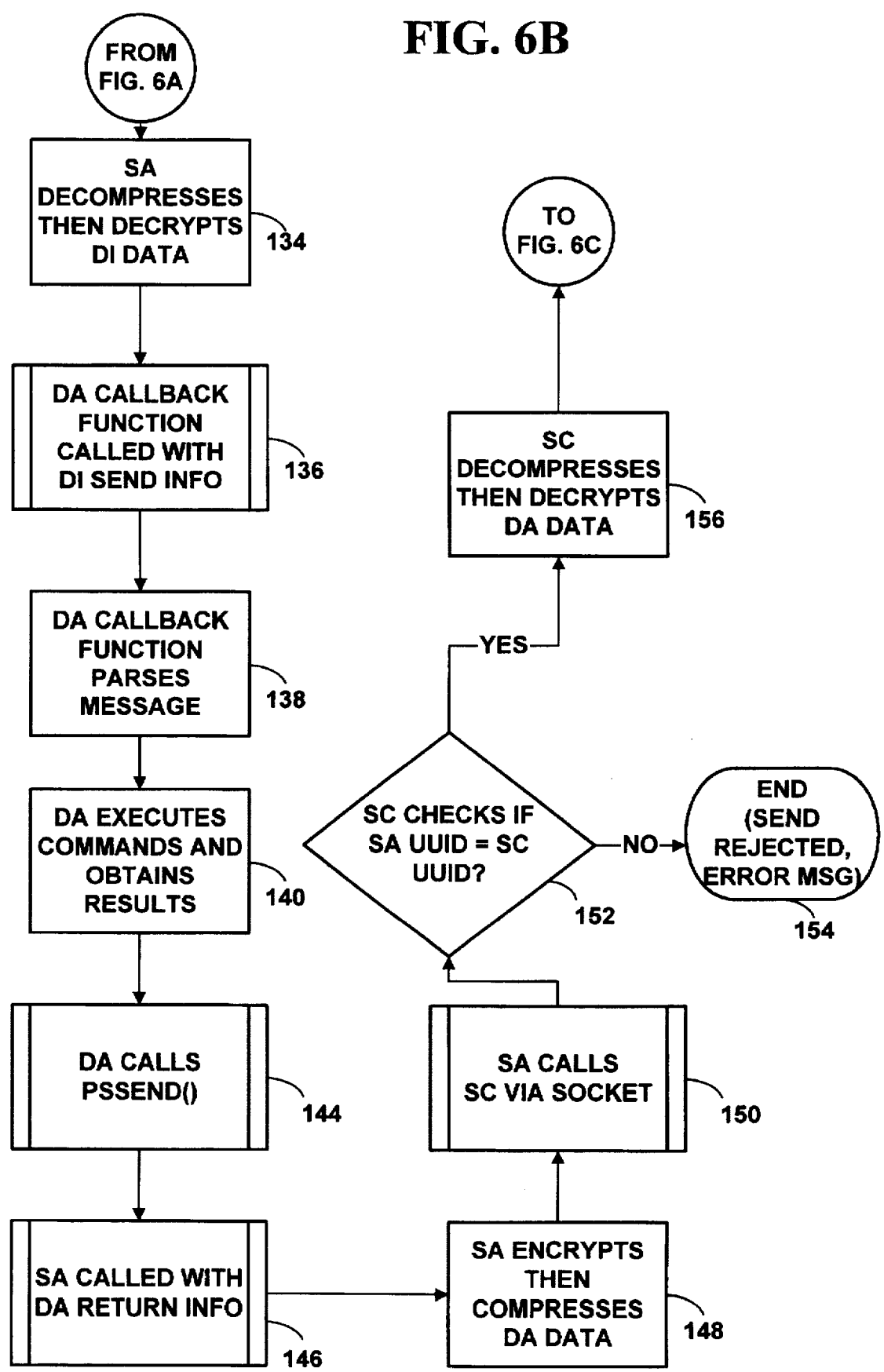
Figure 6C:
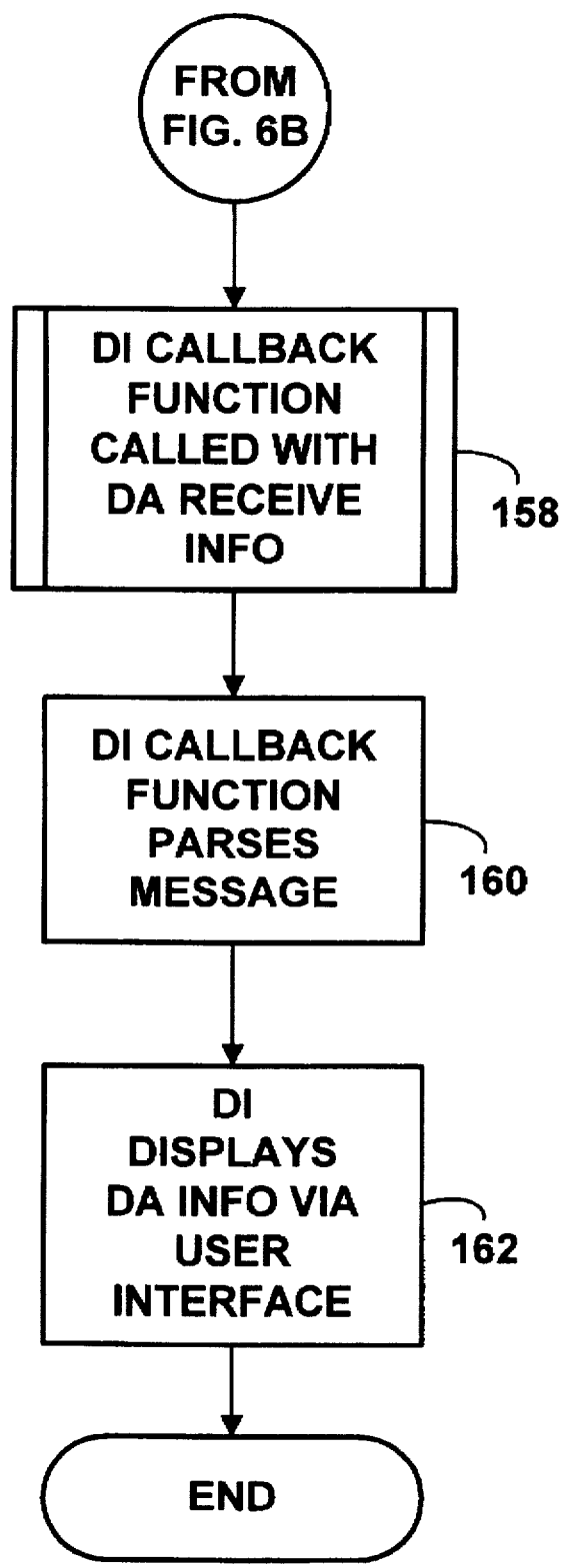

The support client then receives a socket transmission from the support agent (150). The support client performs a mapping between the socket id on which the message came in and the UUID in the message to see if it matches the Message Map (i.e. Message Map=(socket id, UUID, UUID's receive callback function address) as was described above) information for the diagnostic interpreter stored in the support clients's registry (152). If the UUID does not match, then the information is rejected (154) and an error message is sent to the support agent. If the socket id and UUID match, the support client strips the protocol headers and trailers from the message, decompresses and decrypts the data sent by the diagnostic agent (156) and then calls the diagnostic interpreter's receive callback function with the decrypted data as an argument (158) (FIG. 6C). The diagnostic interpreter's callback function then parses the message (160), interprets the data, and displays the results for the PSS engineer (162).

Data sent from the diagnostic agent to the diagnostic interpreter is displayed only on the display device on the PSS side and not on the customer's side. Data transfer is invisible (except for the log which displays all transactions) on the customer's side.

Secure transfer of data in a message through a socket connection is realized by utilizing a public/private key cryptography method such as RSA, DES, etc. Once the PSS connection path is established, any data sent between the PSS and the customer is encrypted, sent, then decrypted using public/private key cryptography. Therefore, the client and server each has a public and private key pair. The public key is visible to the world and the private key is visible only to the host computer.

The support client and the diagnostic interpreter can view the state of the support agent by sending a query request with a PSSGetServerStats(AppID, ServerStatistics, BufferLength) call. The AppID argument is the UUID of the diagnostic interpreter, ServerStatistics identifies the pre-formatted data containing the server's statistical information, and Bufferlength identifies the length of the data in the buffer. The PSSGetServerStats( ) call returns application identifier tuples from the support agent's registry, as well as transmission statistics for the remote support agents.

In the event that the support client questions a network connection to a support agent, the support client sends a message with the PSSPing(AppID) call, where the AppID is the UUID of the requesting diagnostic interpreter. The message is sent is a NULL bodied message. If the network connection is still open and the support agent is still alive and active, the support agent acknowledges the message with a message indicating that the message received (i.e. the message sent via PSSPing( )) was empty. Otherwise, the support agent is dead, so the support client will time out and notify the diagnostic interpreter by creating an error message. The diagnostic agent can use the PSSPing( ) function call as well to check the health of a diagnostic interpreter.

To terminate a socket connection between a diagnostic interpreter 48 and a diagnostic agent 52, the diagnostic executes a PSSDisconnect(AppID, lpfnNotifyProc) call where AppID is the UUID of the requesting diagnostic interpreter and lpfnNotifyProc is the callback function which notifies the diagnostic interpreter with the result of the remote diagnostic agent termination. The diagnostic agent is deregistered and purged from memory on the customer's computer as a result of the PSSDisconnect( ) call.

A diagnostic interpreter can also de-register a diagnostic agent with the PSSDeregister(lpAppID) call, where lpAppID is the UUID of the diagnostic to be deregistered. The deregistration removes the diagnostic agent from the support agent's registry and informs the communications layer 42 that the diagnostic agent is no longer receiving messages. The diagnostic may or may not be purged from memory on the customer's computer.

The PSSDeregister( ) function is available only to the diagnostic interpreter. It is desirable not to allow the diagnostic agent to deregister itself from the support agent and then continue to execute independently.

Since the exact content of a message sent through a socket is treated as opaque data by the communications layer 42, PSS diagnostic programs can assume almost any operational characteristic. For example, the PSS 38 can command a remote diagnostic agent 50 on the customer computer 40 to do tasks such as: (1) download a diagnostic application; (2) execute a resident or downloaded diagnostic application, then receive and review the results; (3) query, receive and update selective sections of the customer's message registry; (4) capture portions/part of a customer's screen or bitmap and transfer it to the PSS for interpretation; (5) query a list of available devices and invoke device diagnostics; (6) query, receive and update information about printer attached to customer's computer; (7) transfer information to/from a clipboard (i.e. a common internal buffer) used on both the PSS and customer's computer; (8) obtain file attributes and transfers files to/from a customer's computer and/or the PSS computer; (9) send and receive packets that could be input into an inference engine on the client's/server's host computer; (10) in connection with an interactive voice response system, automatically "sniff" around on the customer's computer in order to gather diagnostic data and help troubleshoot; and (11) automatically check operating system components on the customer's computer and provide patches and/or upgrades when necessary to the customer's computer up to date. Commands (1) and (2) were explained in detail above.

The remaining command functionality (3)–(11) is implemented in diagnostic applications, each consisting of a diagnostic interpreter and a diagnostic agent. When a diagnostic application is to be used, a diagnostic interpreter is invoked on the PSS computer and registers with the support client following the registration process described above (i.e. PSSRegister( )). The diagnostic interpreter must communicate with the corresponding diagnostic agent on the customer's computer. If the diagnostic agent is not present on the customer's computer, it is downloaded, registered and executed following the process described above (i.e. PSSDownload( ), PSSRegister( ), PSSExecute( )). If it is present, the diagnostic agent registers itself following the registration process described above (i.e. PSSRegister( )).

Each diagnostic agent supplies a receive call back function that is called each time a message arrives for that agent, and identifies two buffers that the support agent can use for sending and receiving messages on the diagnostic agent's behalf. The communications path is then set up following the steps shown in FIGS. 5A–5E. When data is sent between the diagnostic interpreter and the diagnostic agent, the steps shown in FIGS. 6A–6C are followed.

When any diagnostic application is used, the selection of a feature in the diagnostic interpreter switches the Voice-View modems from the voice mode to the data mode and signals the corresponding diagnostic agent to retrieve and send the required data. During the data transfer, the customer is momentarily blocked from talking or listening to the PSS engineer. When the data transfer is complete, the VoiceView modems immediately revert to voice mode. For a long data transfer, a Windows 95 dialog box informs the customer when a data transfer is complete and voice communications can resume.

Data obtained from the customer's computer is displayed for the PSS engineer on the PSS computer only. The data is not seen on the customer's side. However all diagnostic application actions completed on the customer's computer are documented in a transaction log on the customer's computer.

When the PSS engineer has gathered all the necessary information from the customer's computer the diagnostic agent is terminated, unregistered, and purged from memory by a request from the diagnostic interpreter as was described above (i.e. PSSDisconnect( )). The diagnostic interpreter is then de-registered but not purged from memory on the PSS side since the diagnostic interpreter may be used again to help other customers. Each diagnostic interpreter/agent pair uses the mechanisms just described to initialize, communicate and terminate. The functionality of each individual diagnostic application is explained below beginning with the Registry Control Diagnostic.

Registry Control Diagnostic

The Registry Control Diagnostic allows a PSS engineer to remotely navigate through a customer's registry 58 and update necessary system information when necessary. After the Registry Control Diagnostic Agent (Registry Agent) has registered on the customer's computer (i.e. either a resident or downloaded Registry Agent), it opens all the server's registry root keys, does a key information query for all of them, and sends the initial configuration back to the Registry Control Diagnostic Interpreter (Registry Interpreter) on the PSS side via the socket connection. The Registry Interpreter builds a local N-node tree to maintain all the registry hierarchical information it receives. When all customer registry information reaches the Registry Interpreter at the PSS, Registry Diagnostic initialization is complete.

At this point, the Registry Interpreter is ready to retrieve information from and makes changes to the customer's system registry. The Registry Interpreter commands include (1) key and value information querying; (2) remote navigation through the server's system registry; (3) update or create a registry key or registry value. These registry commands invoked by the Registry Interpreter are executed by the Registry Agent on the customer's computer. All registry commands are performed using existing Windows 95 registry functions.

Key and key value information querying allows the Registry Interpreter to query the class of key, the number of subkeys, the number of key values, the security descriptor, and the last write time of a registration key. In addition, the Registry Interpreter is able to query the data stored at each key value.

Remote navigation through the customer's registry allows the Register Interpreter to view the keys and subkeys at each level, providing full capability to transverse the registry hierarchy. Only portions of the registry hierarchy which are needed are transferred, avoiding needless data transfer and a bottle-neck on the socket.

Update or create registry keys and values allows the Register Interpreter to makes changes to the customer's system registry as needed (e.g. creating or deleting keys, subkeys, key values, etc). All changes are logged for the customer.

Screen Capture Diagnostic

The Screen Capture Diagnostic allows a PSS engineer to gather information about a customer's current display environment. After the Screen Capture Agent has registered on the customer's computer, it creates a list of all the windows on the customer's display and of all applications currently running on the customer's computer. The Screen Capture Interpreter uses the Screen Capture Agent's list of windows and applications to build a display list on the PSS engineer's screen where all the customer's display information can be maintained. When all customer window and application information reaches the Screen Capture Interpreter at the PSS, Screen Capture Diagnostic initialization is complete.

At this point, the Screen Capture Interpreter is ready to request customer display information. The Screen Capture Interpreter commands include: (1) selective window capture; and (2) selective application capture.

Selective window capture allows a PSS engineer to select a window to be captured from the list of all window available on a customer's computer. The entire window is then captured by the Screen Capture Agent, the screen image (e.g. in bitmap form) simplified for color-scheme, and is then routed to back to the Screen Capture Interpreter for use by a PSS engineer.

Selective application capture allows a PSS engineer to select an application to be analyzed from the list of all applications that are currently running on the customer's computer. Any and all windows belonging to the selected application are captured, simplified for color-scheme, and then routed to back to the Screen Capture Interpreter for use by a PSS engineer.

Device Manager Diagnostic

The Device Manager Diagnostic allows a PSS engineer to retrieve the properties and characteristics of all hardware devices attached to the customer's computer. In Windows 95, the Device Manager is accessed through the "Systems Properties" sheet dialog in the "Control Panel." The Systems Properties sheet dialog allows a user to view all devices on a computer by device type or device connection. The data conveyed through this dialog is stored in the System Registry Database. The System Registry Database contains information about all attached devices.

To view the devices attached to a customer's computer, along with all values applied to the devices, the PSS engineer selects the Device Manager menu item on the Device Manager Agent's menu. This action initiates a first round of data transfer returning customer's device information by type.

A standard System Properties sheet with a tabbed dialog, labeled with the name of the customer's computer is displayed for the PSS support engineer. The engineer can move down through the dialog to find specific information about devices on the customer's computer. The dialog displays information that was transmitted during the first data transfer.

The PSS engineer's display shows the customer's device information by device "type" as the default. To view the device information by connection, the PSS engineer chooses the connection option on the System Properties dialog. This initiates a second round of data transfer. The display is then updated with connection information data that was transmitted in the second transfer of data. The PSS engineer and the customer can now discuss any findings that resulted from the data exchange.

Printer Properties Diagnostic

The Printer Properties Diagnostic allows a PSS engineer to retrieve the properties of all printers configured or installed on the customer's computer. In Windows 95, the printer properties can be obtained through the Printers icon in the main system dialog, or through the Printers Menu option on the Settings Menu which is located in the Start Menu. The Printer data conveyed through these printer dialogues is stored in the System Registry Database described above.

To view the information on printers attached or installed on a customer's computer, the PSS engineer selects a printer menu item from the printer menus described above. This selection signals the Printer Properties Agent to send the printer data obtained from the System Registry Database.

A dialog box is displayed containing an entry for each known printer on the customer's computer. When the PSS engineer selects on one of these printer names, a standard tabbed Printer property sheet, showing the name of the printer, is displayed and filled with data just retrieved from the customer's computer. Non-applicable menu items that will not be executed by a PSS engineer, such as "Browse" and "Print Test Page" are disabled on each tab of the tabbed dialog.

Clipboard Transfer Diagnostic

The Clipboard Transfer Diagnostic allows a PSS engineer to transfer and retrieve information to/from the clipboard on the customer's computer. The clipboard transfer interface is embedded in the Windows 95 "DaLaunch" application. The Clipboard Transfer Diagnostic Interpreter is embedded in the Windows 95 DaLaunch application. DaLaunch commands the Clipboard Transfer Diagnostic Agent to: (1) read the formats available in the clipboard on the customer's or the PSS engineer's computer; (2) copy a particular format in the clipboard on the customer's computer to the clipboard on the PSS's engineer's computer; and (3) copy a particular format in the clipboard on the PSS engineer's computer to the clipboard on the customer's computer.

The DaLaunch application provides a window called "Clipboard Transfer." When the PSS engineer selects the Clipboard Transfer window, a new drop down menu called "Clipboard Transfer" appears. The new Clipboard Transfer menu has two entries: READ and WRITE. The READ menu item prompts with a list of the customer's clipboard formats (e.g. a word processor format, spreadsheet format, etc.). Once selected, DaLaunch copies the customer's clipboard into the PSS engineer's clipboard. The WRITE menu item prompts with a list of the PSS engineer's clipboard formats. Once selected, DaLaunch copies the PSS engineer's clipboard into the customer's clipboard.

File Attribute Diagnostic

The File Attribute Diagnostic allows a PSS engineer to ascertain the file environment (e.g. file create date, file check sum, etc.) on the customer's computer. The File Attribute interface is embedded in the Windows 95 "DaLaunch" application. DaLaunch commands the File Attribute Diagnostic Agent to: (1) read directory information on a file; (2) read version information on a file; and (3) compute checksums on a file and compare with a known quantity to check for corruption.

After the File Attribute Agent is registered and executed, it collects file attribute information from the customer's computer. When all this information reaches the File Attribute Interpreter embedded in the DaLaunch application at the PSS, the File Attribute Diagnostic initialization is complete.

The DaLaunch application provides a window called "File Attributes." When the PSS engineer selects the File Attributes window, a new drop down menu called "File Attributes" appears. The File Attributes menu provides a dialog box where the PSS engineer can select an item that contains a list of files with their valid attributes obtained from a customer's computer during initialization. Once selected, DaLaunch calls the File Attribute Agent to compare (by computing a checksum) the files on the customer's computer against those same files stored on the PSS for corruption. If corruption is found the corrupted files are replaced.

File Transfer Diagnostic

The File Transfer Diagnostic allows a PSS engineer to read and write files on the customer's computer. The File Transfer interface is embedded in the Windows 95 "DaLaunch" application. DaLaunch commands the File Transfer Diagnostic to: (1) read a file given a complete path on a customer's computer; (2) write a file given a complete path on a customer's computer; and (3) read directory information given a complete path on a customer's computer.

After the File Transfer Agent is registered and executed, it collects file and directory information from the customer's computer. When all this information reaches the File Transfer Interpreter embedded in the DaLaunch application at the PSS, the File Transfer Diagnostic initialization is complete.

The DaLaunch application provides a window called "File Transfer." When the PSS engineer selects the File Transfer window, a new drop down menu called "File Transfer" appears. The File Transfer menu provides a dialog box where the PSS engineer can select from one of three entries: READ, WRITE, and KNOWLEDGE BASE. The READ menu item prompts for a full path name on the customer's computer before reading the file. The WRITE menu item starts with a common dialog for selecting the source file on the PSS engineer's computer and then asks for a full path on the customer's computer. The KNOWLEDGE BASE menu item is described below with the Knowledge Base Diagnostic. Once selected, DaLaunch calls the File Transfer Agent to complete the desired task.

Knowledge Base Diagnostic

The Knowledge Base Diagnostic allows a PSS engineer to send a PSS Knowledge Base Article to the customer's computer. A Knowledge Base Article is a tutorial article on a given subject, often including sequences of commands that may be useful in diagnosing a customer's problem. For example, if the customer has a printer problem, the Knowledge Base Article may include a sequence of questions such as "Is printer on? Is printer cable plugged in to printer and computer? Is printer driver correct for printer type? Is printer driver out of date?" etc.

As was described above, the Knowledge Base Diagnostic is invoked from the File Transfer interface and is controlled by the Windows 95 DaLaunch application. The KNOWLEDGE BASE menu item is chosen from the File Transfer menu. The KNOWLEDGE BASE menu item prompts the PSS engineer with a common dialog for selecting the Knowledge Base file on the PSS engineer's computer, and then asks for the full path on the customer's computer. The Knowledge Base file is then transferred and used to help diagnose the customer's problem. The set of knowledge articles that is sent consists of articles that are relevant to the problem encountered by the customer.

Further Remarks

The diagnostic applications described above can also be spawned automatically with the interaction of a PSS engineer. When a customer has called the PSS and is on hold waiting for the next available PSS engineer, the customer can be presented with an Interactive Voice Response dialog to begin focusing on the trouble area, and collecting the corresponding diagnostic data. For example, before speaking with a PSS engineer, a customer may be asked by the Interactive Voice Response to "Press '1' for printer problems." In response to this signal, a "printer problem submenu" is then activated soliciting more customer responses. The PSS computer then automatically interrogates the customer computer to obtain the relevant printer information based on the customer's responses and the Printer Properties Diagnostic described above. However, a dialog box would ask for customer permission, and the secure login procedure described above would also be followed before any interaction would take place. Again, the transactions would be logged for the customer.

Upon receipt of the printer information, if any printer driver appears to be outdated, PSS automatically downloads and installs an updated driver. When the PSS engineer is available, the necessary background information has already been obtained from the customer's computer, and rudimentary fixes have already been applied. Similar automatic sequences are possible with the other diagnostic applications described above.

The diagnostic applications can also be used to automatically check and upgrade operating system components.

When a customer call the PSS for service, the PSS computer can perform a check of the customer's operating system components. If any of the components is out of date, PSS can automatically provides patches and/or upgrades. The upgrades are invisible to the user. However, a dialog box would ask for customer permission, and the secure login procedure described above would also be followed before any interaction would take place, and the transactions would be logged for the customer. If the upgrade is large, it can be downloaded over time, with a further portion downloaded each time the user connects to the PSS site for help.

The diagnostic applications detailed above are not to be construed as an exhaustive list. Other diagnostic interpreter/agent pairs can be added to solve problems that are common to a group of customers.

Having illustrated and described the principles of the present invention in a preferred embodiment, it should be apparent to those skilled in the art that the embodiment can be modified in arrangement and detail without departing from such principals. Accordingly, we claim as our invention all such embodiments as come within the scope and spirit of the following claims and equivalents thereto.

We therefore claim as our invention all that comes within the scope and spirit of the following claims:

1. A method of providing diagnostic support for a software product installed on a customer computer by using a vendor computer at a remote location, each computer including a CPU coupled to memory and a display, the computers being linked through a single telecommunications circuit, each of said computers being coupled to said telecommunications circuit through a voice/data modem, each of the computers further including a layer of communications software for sending/receiving data and For implementing communication protocols associated with the voice/data modem in said computer, the communications layer of software in the customer computer including a support agent, the communications layer of software in the vendor computer including a support client, the method comprising the steps of:

providing one or more software-implemented diagnostic interpreters on the vendor computer;

registering the one or more diagnostic interpreters with the support client in the vendor computer, said registering including adding an entry to a registry database maintained in the vendor computer in the communications layer of software;

issuing a request from one or more of the diagnostic interpreters to the support client to send a message, said message requesting invocation of one or more software-implemented diagnostic agents on the customer computer;

communicating the request from the support client to the support agent;

checking a registry database in the communications layer of software in the customer computer to determine if the one or more diagnostic agents are registered;

if a requested diagnostic agent is not registered:
notifying the support client that the diagnostic agent is not registered;
using the support client to download the requested diagnostic agent to the support agent;
when the downloading is completed, issuing an execute command from the diagnostic interpreter;
communicating said command from the support client to the support agent, and thence to the customer computer; and
in response to said command, registering the requested diagnostic agent with the support agent;

sending messages from the one of more diagnostic interpreters through the support client to the support agent and thence to the diagnostic agents requesting the one or more diagnostic agents each perform a diagnostic task, said task including the collection of diagnostic data;

returning the collected diagnostic data through the support agent to the support client and thence to the one or more diagnostic interpreters; and displaying data corresponding to said collected diagnostic data on the display of the vendor computer.

2. The method of claim 1 in which the support agent includes at least one of the following operations:

collecting data from a specified sub-section of the registry database in the customer computer; or creating or deleting registry key and value information from the registry database in the customer computer.

3. The method of claim 2 which includes providing support in the diagnostic agent to perform each of the operations listed in claim 2.

4. The method of claim 1 in which the requested diagnostic agent includes at least one of the following operations:

creating a list of all windows on the display of the customer computer;

creating a list of all applications running on the customer computer;

capturing a designated window on the display of the customer computer and compressing data corresponding thereto; or identifying all windows belonging to a selected application running on the customer computer.

5. The method of claim 4 which includes providing support in the diagnostic agent to perform each of the operations listed in claim 4.

6. The method of claim 1 in which the requested diagnostic agent includes collecting data from a system registry database in the customer computer, said registry database indicating properties and characteristics of each device in the customer computer.

7. The method of claim 1 in which the requested diagnostic agent includes collecting data from the customer computer indicating characteristics of a printer associated with said computer.

8. The method of claim 1 in which the requested diagnostic agent includes obtaining data from a clipboard data structure on the customer computer.

9. The method of claim 1 in which the requested diagnostic agent includes obtaining data about file attributes on the customer computer.

10. The method of claim 1 which includes:

using the support client, encapsulating the request from the diagnostic interpreter with a header; and communicating the encapsulated request from the support client to the support agent via a socket allocated thereto.

11. The method of claim 1 in which each of said registering steps include supplying a receive callback function for handling incoming messages, and a unique universal identifier for identifying a registering diagnostic component.

12. The method of claim 11 which includes calling said registered receive callback function when communicating between the diagnostic agent and the diagnostic interpreter.

13. The method of claim 12 which includes calling said registered receive callback function each time the support client receives a message destined for the diagnostic interpreter, said calling serving to notify the diagnostic interpreter of the arrival of a message, and to initiate processing of the message.

14. The method of claim 1 which includes securely terminating communications between the vendor and customer computers by:

sending a terminate command from the support client to the support agent;

in the customer computer, terminating a task in main memory and performing a memory purge to eliminate the diagnostic agent therefrom; and removing a registry entry corresponding to said diagnostic agent from the customer computer.

15. A computer readable medium having stored therein instructions capable of causing a computer to perform the method of claim 1.

16. The method of claim 1 where communicating the request from the support client to the support agent includes a security mechanism with a plurality of security components.

17. The method of claim 16 in which the plurality of security components includes a login identifier and a login password.

18. The method of claim 17 in which the login identifier includes a unique universal identifier.

19. The method of claim 17 in which the login password includes an encrypted Internet Protocol address.

20. In a computer system including first and second computers at spaced-apart first and second locations, each computer including a CPU coupled to memory and a display, the computers being linked through a single telecommunications circuit, each of said computers being coupled to said telecommunications circuit through a voice/data modem, each of the computers further including a layer of communications software for sending/receiving data and for implementing communication protocols associated with the voice/data modem in said computer, an improvement further comprising:

a registry database in the first computer;

a diagnostic agent in the first computer;

a diagnostic interpreter in the second computer, said interpreter comprising software instructions for invoking the diagnostic agent to perform selected functions from the following catalog of functions:

collecting data from a specified section of the first computer's registry database; and creating and deleting registry key and value information from the first computer's registry database;

the diagnostic agent comprising software instructions in the first computer for performing any function from said catalog of functions in response to the diagnostic interpreter, and for transferring data corresponding thereto to the diagnostic interpreter;

the diagnostic interpreter further including means for receiving said transferred data from said diagnostic agent and for presenting data corresponding thereto to a user of the second computer.

21. In a computer system including first and second computers at spaced-apart first and second locations, each computer including a CPU coupled to memory and a display and running a windowed operating system, the computers being linked through a single telecommunications circuit, each of said computers being coupled to said telecommunications circuit through a voice/data modem, each of the computers further including a layer of communications software for sending/receiving data and for implementing communication protocols associated with the voice/data modem in said computer, an improvement further comprising:

a diagnostic agent in the first computer;

a diagnostic interpreter in the second computer, said interpreter comprising software instructions for invoking the diagnostic agent to perform selected functions from the following catalog of functions:

creating a list of all windows on the display of the customer computer; and capturing a designated window on the display of the customer computer and compressing data corresponding thereto;

the diagnostic agent comprising software instructions in the first computer for performing any function from said catalog of functions in response to the diagnostic interpreter, and for transferring data corresponding thereto to the diagnostic interpreter;

the diagnostic interpreter further including means for receiving said transferred data from said diagnostic agent and for presenting data corresponding thereto to a user of the second computer.

22. In a computer system including first and second computers at spaced-apart first and second locations, each computer including a CPU coupled to memory and a display and running a windowed operating system, the computers being linked through a single telecommunications circuit, each of said computers being coupled to said telecommunications circuit through a voice/data modem, each of the computers further including a layer of communications software for sending/receiving data and for implementing communication protocols associated with the voice/data modem in said computer, an improvement further comprising:

- a diagnostic agent in the first computer;
- a diagnostic interpreter in the second computer, said interpreter comprising software instructions for invoking the diagnostic agent to perform the function of identifying all windows belonging to a selected application running on the customer computer;
- the diagnostic agent comprising software instructions in the first computer for performing said function in response to the diagnostic interpreter, and for transferring data corresponding thereto to the diagnostic interpreter;
- the diagnostic interpreter further including means for receiving said transferred data from said diagnostic agent and for presenting data corresponding thereto to a user of the second computer.

23. In a computer system including first and second computers at spaced-apart first and second locations, each computer including a CPU coupled to memory and a display and running a windowed operating system that supports a clipboard data structure, the computers being linked through a single telecommunications circuit, each of said computers being coupled to said telecommunications circuit through a voice/data modem, each of the computers further including a layer of communications software for sending/receiving data and for implementing communication protocols associated with the voice/data modem in said computer, an improvement further comprising:

- a diagnostic agent in the first computer;
- a diagnostic interpreter in the second computer, said interpreter comprising software instructions for invoking the diagnostic agent to perform the function of obtaining data from the clipboard data structure in the customer computer;
- the diagnostic agent comprising software instructions in the first computer for performing said function in response to the diagnostic interpreter, and for transferring data corresponding thereto to the diagnostic interpreter;
- the diagnostic interpreter further including means for receiving said transferred data from said diagnostic agent and for presenting data corresponding thereto to a user of the second computer.

24. A method of providing support for a software product installed on a customer computer system by using a vendor computer system at a remote location, each computer system including a CPU coupled to memory and a display, the computer systems being linked through a single telecommunications circuit, each of said computer systems being coupled to said telecommunications circuit through a voice/data modem, each of the computer systems further including a layer of communications software for sending/receiving data and for implementing communication protocols associated with the voice/data modem in said computer systems, the method comprising the steps of:

- receiving a call from a customer at the remote location;
- coupling the call to an interactive voice response unit (IVRU);
- conducting an interactive machine/person dialog to aid in identifying the support required, said dialog including alternately posing a series of voiced options to the customer from the IVRU, and receiving tone responses thereto; and
- automatically transferring diagnostic data from the customer computer system to the vendor computer system, the diagnostic data transferred being dependent on the tone responses provided to the IVRU;
- wherein the interactive dialog aids in identifying the support required, and diagnostic data corresponding thereto is made available at the vendor computer system without intervention by product support personnel at the remote location.

25. The method of claim 24 in which the transferring step includes:

- sending a request for said diagnostic data from the vendor computer system to the customer computer system; and
- in response to said request, invoking an application software program in the customer computer system to service said request.

26. The method of claim 24 which includes displaying at least a portion of the transferred diagnostic data on the display of the vendor computer system for presentation to a customer support representative.

27. The method of claim 24 which includes performing an automated analysis of the diagnostic data at the vendor computer system, said analysis suggesting a remedial action, and automatically transmitting remedial data to the customer computer system.

28. The method of claim 27 in which the automated analysis suggests a set of data at the customer computer system is outdated, and automatically transmitting updated data corresponding thereto to the customer computer system.

29. A computer readable medium having stored therein instructions capable of causing a computer to perform the method of claim 24.

30. A method of providing diagnostic support for a software product installed on a customer computer by using a vendor computer at a remote location, each computer including a CPU coupled to memory and a display, the computers being linked through a single telecommunications circuit, each of said computers being coupled to said telecommunications circuit through a voice/data modem, each of the computers further including a layer of communications software for sending/receiving data and for implementing communication protocols associated with the voice/data modem in said computer, the communications layer of software in the customer computer including a support agent, the communications layer of software in the vendor compute including a support client, the method comprising the steps of:

- providing a software-implemented diagnostic interpreter;
- registering the diagnostic interpreter with the support client in the vendor computer, said registering including adding an entry to a registry database maintained in the vendor computer;
- issuing a request from the diagnostic interpreter to the support client to send a message, said message requesting invocation of a software-implemented diagnostic agent;
- communicating the request from the support client to the support agent;
- checking a registry database in the customer computer to determine if the diagnostic agent is registered, the checking including collecting data from a system registry database in the customer computer, the system registry database indicating properties and characteristics of each device in the customer computer;

if the diagnostic agent is not registered:
- notifying the support client that the diagnostic agent is not registered;
- using the support client to download the diagnostic agent to the support agent;
- when the downloading is completed, issuing an execute command from the diagnostic interpreter;
- communicating said command from the support client to the support agent, and thence to the customer computer; and
- in response to said command, registering the diagnostic agent with the support agent;

sending a message from the diagnostic interpreter through the support client to the support agent and thence to the diagnostic agent requesting the diagnostic agent to perform a diagnostic task, said task including the collection of diagnostic data;

returning the collected diagnostic data through the support agent to the support client and thence to the diagnostic interpreter; and displaying data corresponding to said collected diagnostic data on the display of the vendor computer.

31. A computer readable medium having stored therein instructions capable of causing a computer to perform the method of claim 30.

32. A method of providing diagnostic support for a software product installs on a customer computer by using a vendor computer at a remote location, each computer including a CPU coupled to memory and a display, the computers being linked through a single telecommunications circuit, each of said computers being coupled to said telecommunications circuit through a voice/data modem, each of the computers further including a layer of communications software for sending/receiving data and for implementing communication protocols associated with the voice/data modem in said computer, the communications layer of software in the customer computer including a support agent, the communications layer of software in the vendor computer including a support client, the method comprising the steps of:

providing a software-implemented diagnostic interpreter;

registering the diagnostic interpreter with the support client in the vendor computer, said registering including adding an entry to a registry database maintained in the vendor computer;

issuing a request from the diagnostic interpreter to the support client to send a message, said message requesting invocation of a software-implemented diagnostic agent;

using the support client, encapsulating the request from the diagnostic interpreter with a header;

communicating the request from the support client to the support agent via a socket allocated thereto;

checking a registry in the customer computer to determine if the diagnostic agent is registered;

if the diagnostic agent is not registered:
- notifying the support client that the diagnostic agent is not registered;
- using the support client to download the diagnostic agent to the support agent;
- when the downloading is completed, issuing an execute command from the diagnostic interpreter;
- communicating said command from the support client to the support agent, and thence to the customer computer; and
- in response to said command, registering the diagnostic agent with the support agent;

sending a message from the diagnostic interpreter through the support client to the support agent and thence to the diagnostic agent requesting the diagnostic agent to perform a diagnostic task, said task including the collection of diagnostic data;

returning the collected diagnostic data through the support agent to the support client, and thence to the diagnostic interpreter; and displaying data corresponding to said collected diagnostic data on the display of the vendor computer.

33. A computer readable medium having stored therein instructions capable of causing a computer to perform the method of claim 32.

* * * * *

UNITED STATES PATENT AND TRADEMARK OFFICE
CERTIFICATE OF CORRECTION

PATENT NO. : 5,678,002
DATED      : Oct. 14, 1997
INVENTOR(S) : Fawcett, et al

It is certified that error appears in the above-identified patent and that said Letters Patent is hereby corrected as shown below:

Column 16, line 8, "For" should be --for--;

Column 16, line 34, "the diagnostic" should be --the requested diagnostic--;

Signed and Sealed this

Third Day of November, 1998

Attest:

Attesting Officer

BRUCE LEHMAN

Commissioner of Patents and Trademarks